(12) United States Patent
Teasley

(10) Patent No.: US 10,593,326 B2
(45) Date of Patent: Mar. 17, 2020

(54) SYSTEM, METHOD, AND APPARATUS FOR LOCATION-BASED CONTEXT DRIVEN SPEECH RECOGNITION

(71) Applicant: Sensory, Inc., Santa Clara, CA (US)

(72) Inventor: William Teasley, Santa Clara, CA (US)

(73) Assignee: SENSORY, INCORPORATED, Santa Clara, CA (US)

( * ) Notice: Subject to any disclaimer, the term of this patent is extended or adjusted under 35 U.S.C. 154(b) by 293 days.

(21) Appl. No.: 13/870,580

(22) Filed: Apr. 25, 2013

(65) Prior Publication Data
US 2014/0324431 A1      Oct. 30, 2014

(51) Int. Cl.
*G10L 15/22* (2006.01)
*G10L 15/26* (2006.01)

(52) U.S. Cl.
CPC .............. *G10L 15/22* (2013.01); *G10L 15/26* (2013.01); *G10L 2015/228* (2013.01)

(58) Field of Classification Search
CPC .............. G10L 15/22; G10L 2015/221; G10L 2015/223; G10L 15/26
USPC ................................................ 704/246, 235
See application file for complete search history.

(56) References Cited

U.S. PATENT DOCUMENTS

| | | | |
|---|---|---|---|
| 5,524,169 A * | 6/1996 | Cohen et al. ............. | 704/231 |
| 7,437,295 B2 * | 10/2008 | Pitts et al. .............. | 704/275 |
| 8,255,224 B2 * | 8/2012 | Singleton et al. ........ | 704/275 |
| 8,571,580 B2 * | 10/2013 | Altman et al. ........... | 455/456.3 |
| 8,694,522 B1 * | 4/2014 | Pance ................. | G06F 17/30867 707/706 |
| 8,713,593 B2 * | 4/2014 | Humphrey ............. | G06Q 30/02 725/18 |
| 8,798,588 B2 * | 8/2014 | Koh ................... | H04W 4/021 455/412.1 |
| 8,818,706 B1 * | 8/2014 | Ogale .................. | G01C 21/005 340/539.1 |
| 8,930,162 B2 * | 1/2015 | Wang .................. | H04W 4/02 702/150 |
| 9,749,780 B2 * | 8/2017 | Huang .................. | H04W 4/02 |

(Continued)

FOREIGN PATENT DOCUMENTS

WO     WO-2006052401 A1 *   5/2006   ............. G08C 17/00

*Primary Examiner* — Daniel C Washburn
*Assistant Examiner* — Oluwadamilola M Ogunbiyi
(74) *Attorney, Agent, or Firm* — Fountainhead Law Group PC

(57) ABSTRACT

Systems, methods, and devices for location-based context driven speech recognition are disclosed. A mobile or stationary computing device can include position locating functionality for determining the particular physical location of the computing device. Once the physical location of the computing device determined, a context related to that particular physical location. The context related to the particular physical location can include information regarding objects or experiences a user might encounter while in that particular physical location. The context can then be used to determine delimited or constrained speech recognition vocabulary subset based on the range of experiences a user might encounter within a particular context. The speech recognition vocabulary subset can then be referenced or used by a speech recognizer to increase the speed, accuracy, and effectiveness in receiving, recognizing, and acting in response to voice commands received from the user while in that particular physical location.

18 Claims, 9 Drawing Sheets

(56) References Cited

U.S. PATENT DOCUMENTS

| | | | |
|---|---|---|---|
| 2001/0029184 A1* | 10/2001 | l'Anson | H04W 4/021 455/456.2 |
| 2002/0133571 A1* | 9/2002 | Jacob | G06Q 30/02 709/219 |
| 2003/0125869 A1* | 7/2003 | Adams, Jr. | G01C 21/20 701/532 |
| 2003/0186697 A1* | 10/2003 | Bazin | H04W 8/005 455/434 |
| 2004/0243417 A9* | 12/2004 | Pitts, III | G06F 17/3043 704/276 |
| 2005/0038876 A1* | 2/2005 | Chaudhuri | G06F 17/3087 709/219 |
| 2006/0109107 A1* | 5/2006 | Staton | B60R 25/00 340/539.13 |
| 2006/0230350 A1* | 10/2006 | Baluja | G06F 3/0237 715/700 |
| 2007/0027732 A1* | 2/2007 | Hudgens | G06Q 10/06 705/7.15 |
| 2007/0287474 A1* | 12/2007 | Jenkins | H04W 4/02 455/456.2 |
| 2009/0085873 A1* | 4/2009 | Betts | G08B 13/1427 345/169 |
| 2009/0149200 A1* | 6/2009 | Jayasinghe | H04W 4/001 455/456.3 |
| 2010/0161733 A1* | 6/2010 | Bower | G06F 3/0237 709/206 |
| 2010/0182145 A1* | 7/2010 | Ungari | G09B 29/10 340/539.13 |
| 2010/0197323 A1* | 8/2010 | Freeburg | H04W 4/02 455/456.2 |
| 2012/0016670 A1* | 1/2012 | Khorashadi | G10L 15/26 704/231 |
| 2012/0086549 A1* | 4/2012 | Barnes, Jr. | G06Q 10/1053 340/5.61 |
| 2012/0214507 A1* | 8/2012 | Vartanian | G01S 15/08 455/456.1 |
| 2012/0214515 A1* | 8/2012 | Davis | G01S 5/22 455/456.3 |
| 2013/0045729 A1* | 2/2013 | Haik | H04W 4/02 455/418 |
| 2013/0317944 A1* | 11/2013 | Huang | G01S 5/0252 705/26.61 |
| 2014/0019126 A1* | 1/2014 | Abrams et al. | 704/235 |
| 2014/0039888 A1* | 2/2014 | Taubman | H04M 1/72572 704/235 |
| 2014/0171052 A1* | 6/2014 | LaMarca | H04W 4/02 455/418 |
| 2014/0253708 A1* | 9/2014 | Allen | G08B 21/24 348/77 |
| 2014/0278444 A1* | 9/2014 | Larson | H04M 1/72522 704/275 |

* cited by examiner

SYSTEM, METHOD, AND APPARATUS FOR LOCATION-BASED CONTEXT DRIVEN SPEECH RECOGNITION

CROSS REFERENCE TO RELATED APPLICATIONS

Not applicable.

BACKGROUND

The present invention relates to speech recognition, and in particular, to systems, methods, and devices for location-based, context-driven speech recognition.

Unless otherwise indicated herein, the approaches described in this section are not prior art to the claims in this application and are not admitted to be prior art by inclusion in this section.

The popularity of speech recognition as a means for interacting with computing devices continues to increase. This is especially true for mobile computing device. As the form factor of such mobile computing devices shrink, the amount of space available for the various components of the device also shrinks. The effect of the reduced space is typically a demand for such constituent parts to be further miniaturized. However, the size of various aspects of a small mobile computing device, such as the user interface, can be reduced only so much before it becomes difficult to use or completely ineffective. For example, physical buttons, like those on a physical QWERTY keyboard, or graphical user interfaces with various interactive and adaptive controls displayed on a touch screen, rapidly lose their functionality and effectiveness as they are made so small that users can not physically operate them. Similarly, the display size on such small form factor devices are limited in the amount and type of information they can reasonably display to user with otherwise normal eye sight.

Furthermore, many existing and emerging government regulations are directed toward limiting the use of various types of mobile computing devices while operating motor vehicles. For example, many jurisdictions have implemented mandatory hands-free operation of mobile telephones and have completely prohibited sending text messages while driving.

To address such regulatory and size limitations, many solutions have implemented various types of speech recognition and voice synthesis features. Most of such systems use large databases of recognizable vocabularies in order to address any and all possible scenarios in which a user may wish to interact with the computing device. Such large-scale recognizable vocabularies typically require considerable computing resources that are not available on small, mobile, battery-operated computing devices. To address this particular limitation, most contemporary mobile speech recognition systems simply send the voice command data to a central or cloud-based speech recognition computer that has the requisite computing resources to effectively handle large-scale recognizable vocabulary databases. The remote speech recognizer then sends the results back to the mobile computing device over the network. Such networked mobile computing speech recognition systems can only work when there is available and adequate wireless data bandwidth over which to send and receive the necessary speech recognition related data.

Other systems, in an effort to work around the requirement for available and adequate bandwidth for centralized processing of speech recognition commands, have implemented use of various task or device specific recognizable vocabularies to reduce the requisite processing power of a standalone mobile computing device. By reducing the expected recognizable vocabulary, remote computing device need only consider a limited number of possible recognizable commands. While effective in some scenarios, such limited recognizable vocabularies are typically static and do not allow the user or the remote computing device to adapt to new or changing scenarios or environmental conditions.

Thus, there is a need for improved speech recognition in remote and standalone mobile computing devices. The present invention solves these and other problems by providing systems, methods, and apparatuses for location-based context-driven speech recognition.

SUMMARY

Embodiments of the present invention improve speech recognition systems and devices. In one embodiment the present invention includes a mobile device having a position locator for determining a physical location of the device, a vocabulary processor coupled to the position locator for determining a vocabulary subset from a universal vocabulary based on the physical location, and a speech recognizer coupled to the vocabulary processor for recognizing a voice command from a user based on the vocabulary subset and generating a command message in response to the voice command. In related embodiments, the device can include a display or voice synthesizer for outputting data in response to the command message. In such embodiments, the output data can include information associated with the context.

In some embodiments, the vocabulary subset can include a list of expected voice commands based on a context associated with the physical location. In such embodiments, the context can include a plurality of features in proximity to the physical location. Such features can include static and/or interactive features.

In other embodiments, the device can include a wireless transmitter coupled to the speech recognizer for transmitting the command message from the device to one of the interactive features.

Other embodiments are directed towards methods that can include determining a physical location of a device, determining a vocabulary subset from a universal vocabulary based on the physical location, and recognizing a voice command from a user based on the vocabulary subset. Such methods can also include generating a command message in response to the voice command. In one embodiment, the vocabulary subset can include a list of expected voice commands based on a context associated with the physical location. Such methods can also include outputting data in response to the command message through a display or voice synthesizer. The output data can include information associated with the context. Such contexts can include a plurality of features in proximity to the physical location. The plurality of features can include static or interactive features. Related embodiments can also include transmitting the command message from the device to one of the interactive features.

Other embodiments can include systems that can include a context data store for storing a universal vocabulary comprising a plurality of vocabulary subsets, wherein at least some of the vocabulary subsets are associated with a physical location, and a portable consumer device coupled to the context data store. The portable consumer device can include a position locator for determining a first physical location of the device, a vocabulary processor coupled to the position locator for determining a first vocabulary subset from the plurality of vocabulary subsets based on the first physical location, and speech recognizer coupled to the vocabulary processor for recognizing a voice command from a user based on the first vocabulary subset and generating a first command message based on the voice command. The first vocabulary subset can include a plurality of expected voice commands based on a context associated with the first physical location. The portable consumer device can also include a display or voice synthesizer for outputting data in response to the command message.

In related embodiments, the context can include a number of features in proximity to the physical location. The features can include static and interactive features.

In yet other embodiments, the portable consumer device can also include a wireless transmitter coupled to the speech recognizer for transmitting the command message from the device to one of the interactive features.

The following detailed description and accompanying drawings provide a better understanding of the nature and advantages of the present invention.

DETAILED DESCRIPTION

Described herein are techniques for systems, methods, and apparatuses for location-based context driven speech recognition. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Various embodiments of the present invention can include the use of a mobile computing device, such as a smart phone or tablet computer, that includes location determination capabilities for determining the precise or approximate location of the mobile computing device at any particular time. Such location determination capabilities can include various types of open source and proprietary devices and systems, such as global positioning systems (GPS) for outdoor location determination, and radio, sonic, or laser signal triangulation systems for indoor and outdoor location determination. Various embodiments of the present invention can include a mobile computing device that has integrated or add-on location determination systems, devices, or functions.

By determining its precise or approximate location, the mobile computing device can determine a specific context based on the determined location. This context can be used to determine one or more reduced or limited speech recognition vocabularies for use or reference during various types of speech recognition functionality. Such reduced or limited speech recognition vocabularies are useful for reducing the number of expected voice commands that a speech recognizer in the mobile computing device would need to consider, thus increasing the accuracy and effectiveness of speech recognition control or interaction with the mobile computing device. Additionally, by first determining a reduced or limited expected speech recognition vocabulary, less powerful, and accordingly, less expensive, processors can be used in the implementation of the mobile computing device that includes speech recognition. As such, various embodiments of the present invention not only increase the effectiveness of speech recognition commands and interactions, but also reduce the cost and requisite computing resources required to implement such speech recognition enabled mobile computing devices.

Figure 1:
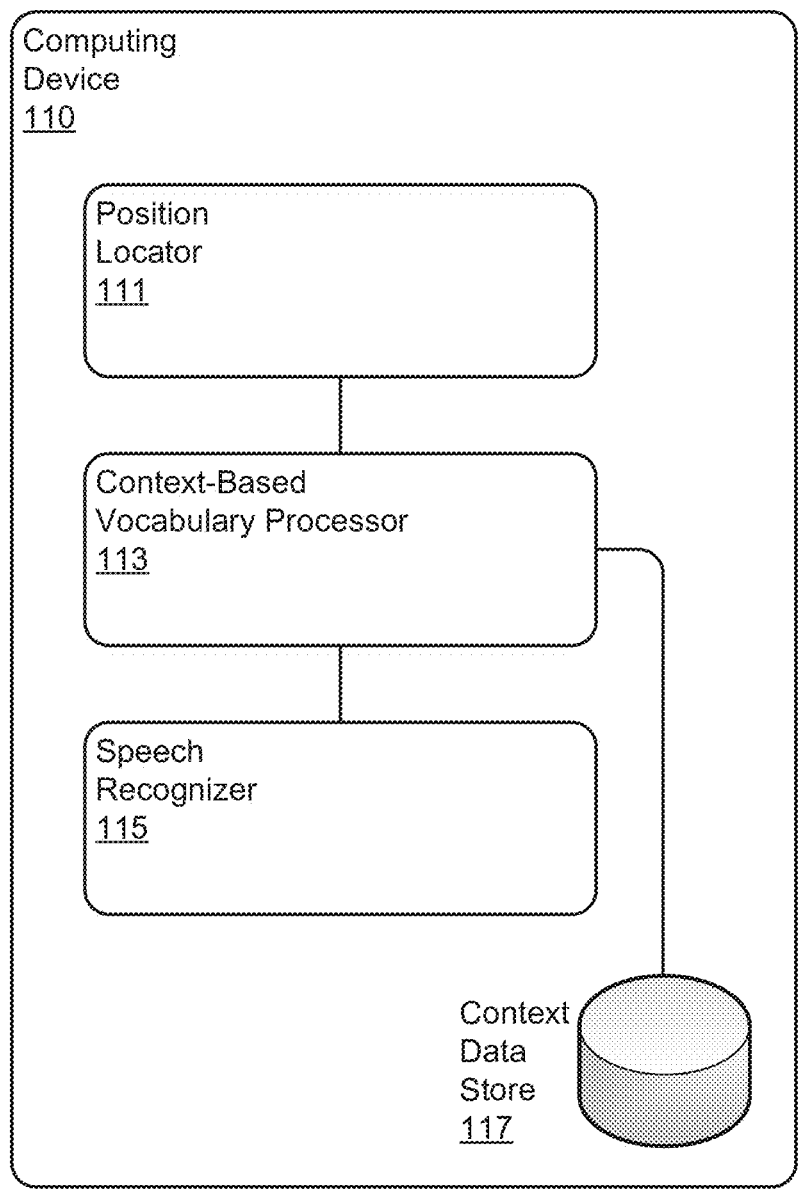
FIG. 1 illustrates a simplified schematic of a speech recognition system according to various embodiments of the present invention.

FIG. 1 is a simplified schematic of a computing device 110 according to various embodiments of the present invention. As shown, computing device 110 can include a number of constituent components which can include, but is not limited to, a position locator 111, a context-based vocabulary processor 113, and speech recognizer 115. In some embodiments, the context based vocabulary processor 113 can be coupled to a context data store 117. In various other embodiments, the position locator 111 can be coupled to the context based vocabulary processor 113 which can be coupled to the speech recognizer 115. While not explicitly depicted in FIG. 1, any and all of the constituent components of the computing device 115 can be coupled to and in communication with one another over one or more various types of communication networks or data buses.

Computing device 110 can be embodied in various types of mobile and stationary devices. For example computing device 110 can be or be included in various devices such as, but not limited to, a smart phone, a laptop computer, a tablet computer, a pedometer, a desktop computer, a handheld or vehicle mounted GPS unit, a remote control, a PDA, a wristwatch, an MP3 or music player, etc. In any such embodiments, the computing device 110 can be carried with the person or included in a vehicle that can move around from place to place. Such mobile devices can also include various types of power sources, such as batteries or solar cells, as well as various wired and wireless networking or communication capabilities or interfaces not shown in FIG. 1. In other embodiments, the computing device 110 can be deployed in a stationary position or moved only occasionally on a limited basis. For example, computing device 110 can include a desktop computer, a kiosk, a warning or an informational sign/display, a light post, an ATM, etc. Such stationary or limited movement embodiments of the present invention can also include various types of power supplies that can be connected to an electrical power utility, a battery, solar cells, etc., as well as include various wired and wireless networking communication capabilities or interfaces not shown in FIG. 1.

In other embodiments, computing device 110 can be an add-on or peripheral device that can be coupled to another computing device, such as a smart phone or laptop computer, to provide various location-based context speech recognition capabilities to the computing device. In such embodiments, the computing device 110 can include a peripheral communication interface to communicate with the separate computing device, i.e. USB, IEEE 1394, Thunderbolt™, Bluetooth™, etc.

According to various embodiments, the position locator 111 can determine the location of the computing device 110, which may or may not include the location of a user operating computing device 110, and send such location information to the context-based vocabulary processor 113. The location information can include various types of location-specifying data, such as GPS coordinates or location-specific zone identifiers. Location-specific zone identifiers can include information that is specific to a particular location or region in which the computing device 110 is located. For example, the computing device 110 might be located in a particular park, stadium, mall, store, library, etc. The operator of such a location may assign various location-specific identifiers to various regions within a particular location. For example, a department store may divide a store by the various departments or regions/zones, i.e. menswear, sportswear, hardware, etc., and then further segment those constituent regions within the department store into even more granular regions, i.e. casual wear and eveningwear. Each such region or sub region within a particular location may or may not overlap with one or more adjacent regions or sub regions. Accordingly, it is possible for the computing device 110 to be located in one or more overlapping regions or sub regions.

Once position locator 111 determines the position of the computing device 110 with reference to a particular coordinate or zonal system, the position locator 111 can send the position information or data to the context-based vocabulary processor 113. In some embodiments, the context based vocabulary processor 113 can receive raw coordinate or position information and translate that raw coordinate or position information into a zonal system associated with a particular location. Context-based vocabulary processor 113 can take such position information and refer to a zonal map/definition to determine a specific zone and or sub zone. In such embodiments, the zonal map can include multiple unassociated locations, such as a department store, a fair ground, an amusement park, a municipal park, etc. Based on the position information, the context based vocabulary processor 113 can determine one or more zonal maps associated with the location of the computing device 110. The context based vocabulary processor 113 can then determine a predetermined context associated with a specific position or zone in which that position is located. Based on the predetermined context associated with the specific position or zone in which the computing device 110 is located, the context-based vocabulary processor 113 can determine one or more vocabulary subsets from a universal vocabulary. In some embodiments, the context-based vocabulary processor 113 can reference a context data store 117 in computing device 110. In related embodiments, vocabulary subsets can include words, commands, phrases, etc., associated with the determined context. Such vocabulary subsets can be tailored to provide a limited expected vocabulary to optimize the accuracy of expected voice interactions received from a user in that specific context.

Once the context-based vocabulary processor 113 determines a vocabulary subset from the universal vocabulary, it can provide the vocabulary subset to the speech recognizer 115. The speech recognizer 115 can then reference the determined vocabulary subset when receiving voice commands from a user to limit the expected voice commands received from the user. By limiting the expected voice commands from a user, the speech recognizer 115 can achieve better accuracy with respect to successfully interpreting and/or executing a user's voice command.

Figure 2:
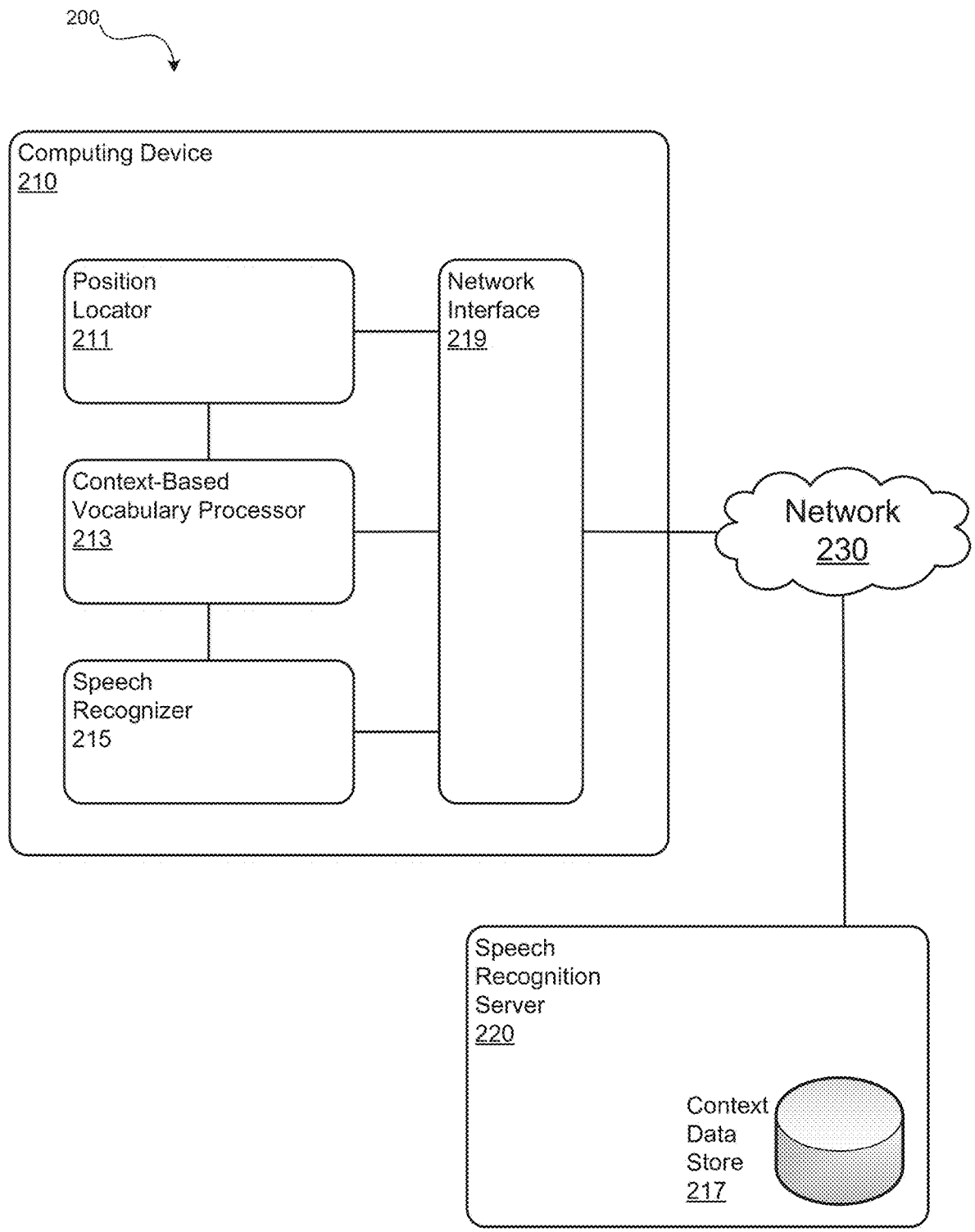
FIG. 2 illustrates a simplified schematic of a speech recognition system according to various embodiments of the present invention.

FIG. 2 is a simplified schematic of a context base speech recognition system 200 according to another embodiment of the present invention. As shown, the system 200 can include a computing device 210 coupled to a speech recognition server 220 through a network 230. In such embodiments, the network 230 can include various types of communication networks and media, such as the Internet, mobile wireless communication networks, Wi-Fi, Bluetooth, and other local and wide area wireless communication networks. In such embodiments, the computing device 210 can include a position locator 211 coupled to a context-based vocabulary processor 213, and a speech recognizer 215. The position locator 211, the context-based vocabulary processor 213, and the speech recognizer 215 can all be coupled to the network interface 219. Network interface 219 can facilitate communication between any one of the position locator 211, context-based vocabulary processor 213, or speech recognition recognizer 215 with the remote speech recognition server 220 through the network 230. In such embodiments, speech recognition server 220 can include a context data store 217 that anyone of the constituent components of computing device 210 can reference in order to implement location-based context-limited speech recognition. For example, context-based vocabulary processor, 213 through network interface 219 and network 230, can access the context data store 217 to determine a context and or vocabulary subset based on a particular coordinate or position information received from the position locator 211. The context-based vocabulary processor 213 can then provide the vocabulary subset to the speech recognizer 215. The speech recognizer 215, as described above in reference to speech recognizer 115, can use the vocabulary subset specific to the context of the determined location of the computing device 210 to limit the expected voice commands from a user.

System 200, in which the speech recognition server 220 and the context data store 217 are located remotely from the computing device 210 are advantageous because zonal, context, and vocabulary subset information stored in the context data store 217 can be updated as needed by one or more operators of locations implementing various location-based context-limited speech recognition services for the users of computing device 210. Accordingly, as a particular location is rearranged, i.e. fixtures are moved or rearranged, or moved from one geographic location to another, i.e. a fair or circus moves from one city to another, the associated zonal maps and associated context can be augmented and/or updated to reflect the change in positions or locations.

Figure 3:
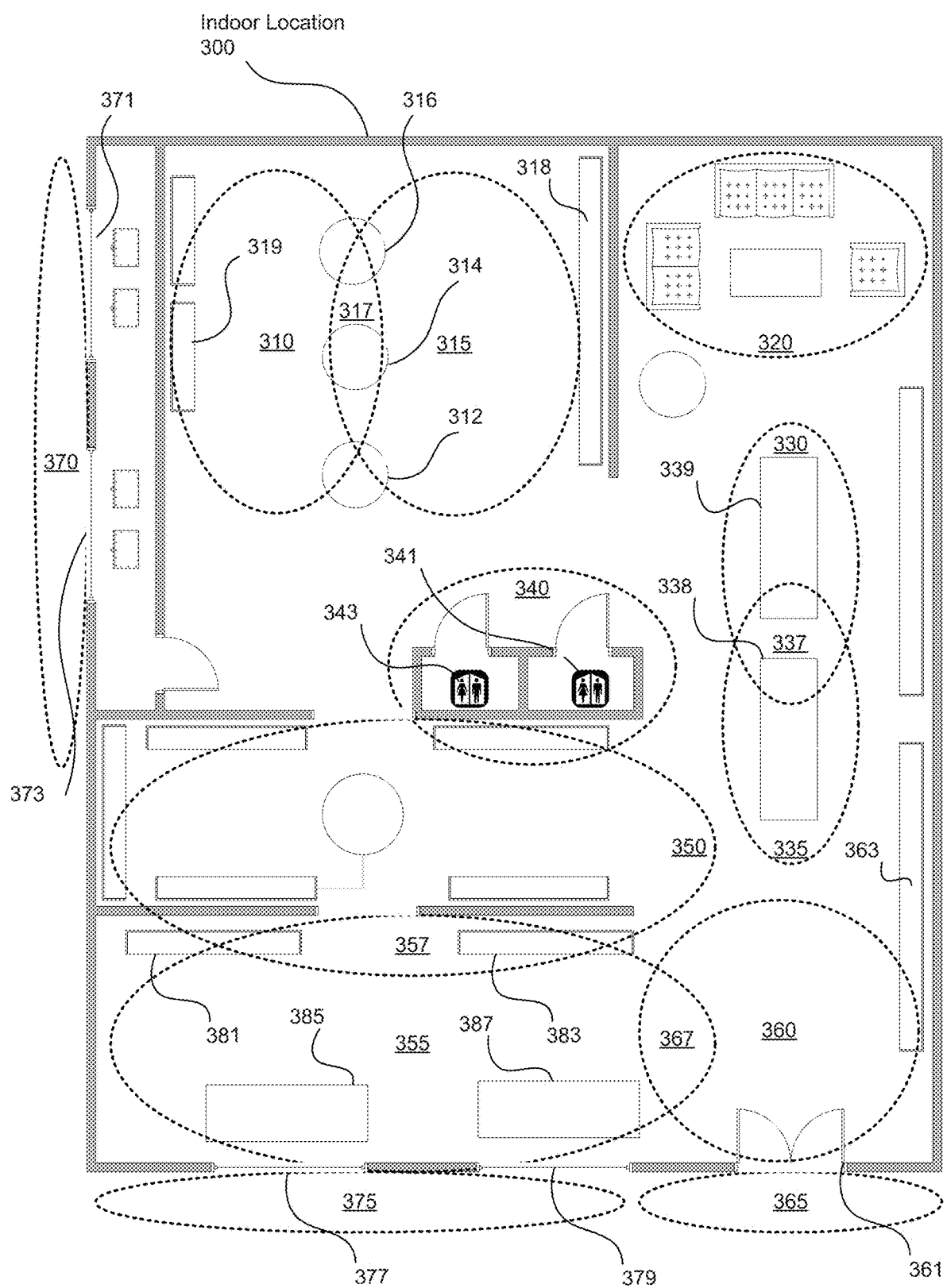
FIG. 3 illustrates a simplified schematic of a speech recognition system according to various embodiments of the present invention.

FIG. 3 illustrates an exemplary indoor embodiment of context zone definitions for location-based context limited speech recognition. As shown, indoor location 300 can include the space in and around one or more floors of a building or other enclosure. The space in around the indoor location 300 can systematically or arbitrarily be divided up into various exclusive or overlapping zones. In some embodiments, each zone can be defined by objects, i.e. merchandise, facilities, and fixtures, that a user might encounter or see while physically located in that particular zone. In other embodiments, each zone can be defined by sounds, smells, and other sensations that a user might encounter or otherwise sense while physically located in a zone. For example, one or more zones within the indoor location 300 can be defined by the area in which a user can hear music playing from a limited or directed range speaker. Similarly, one or more zones within the indoor location 300 can be defined by the area in which the particular odor, i.e. baking bread or perfume, can be smelled.

In yet other embodiments, the zones might be defined by traditional or customary uses of particular areas or rooms of a particular building or structure. For example, zones of 360 and 365 inside and outside entry door 361 of an indoor location 300, such as a hospital, library, theater, school, store, etc. are traditionally referred to as the entry or entrance area of the building. In such entrance areas, users are typically presented with various types of informational signs and maps regarding the location of specific objects, people, services, or rooms within the building. Accordingly, the context of zones 360 and 365 can be related to information and activities typically encountered or performed by users who find themselves in the entrance zone areas 360 and 365. Similarly, the context of zone 340 can be defined by its vicinity to the restrooms 343 and 341. Some zones, such as zones 340 around restrooms 343 and 341, zones 360 and 365 in and around entrance door 361, then zones 370 and 375 in the vicinity of the exterior of display windows 371, 373, 377, and 379, can be permanent or otherwise fixed about various fixed building features, such as building elements or rooms. For example, zones 370 and 375 can be defined as the area outside display windows and the context can be related to the permanent or temporary display of information, goods, or merchandise shown or arranged in the display window. Other zones, while not shown in FIG. 3, can be defined around exits, elevators, stairs, fire escapes etc. and associated with one or more contexts related to or that include general or building element-specific uses or other characteristics.

In one exemplary embodiment, a user carrying a stand-alone or networked mobile computing device, such as computing device 110 or computing device 210 can walk into the indoor location 300 through entrance doors 361. While the user is in zones 365 or 360, the mobile computing device can, using various types of position locators, determine that the computing device and the user are in or near zones 360 and/or 365. Based on the determination of position in zones 360 and/or 365, the context-based vocabulary in the computing device can determine one or more contexts associated with the zones. Once the context is determined, the context-based vocabulary processor can determine or retrieve one or more speech recognition vocabulary subsets associated with the determined contexts. A speech recognizer in the computing device can then reference the speech recognition vocabulary subsets in a constrained or limited expected vocal-command/speech recognition mode. For example, zone 360 can include a context related to the entrance or reception area of the building and possibly include contexts related to items located on the display case 363. In such embodiments, the speech recognition vocabulary subsets can be tailored to include a reduced set of expected voice commands or terms regarding and/or related to building entrance information for the specific items currently on display in display case 363. For example, the speech recognition vocabulary subsets can include constraints on a larger universal speech recognition vocabulary to configure the speech recognizer in the mobile computing device to expect questions for directions to a specific location in the building, i.e. restrooms 343 or 341 or customer service desk, or questions about a specific object, i.e. a shirt or piece of jewelry, in display case 363.

In yet other embodiments, the zones can be defined by a predetermined multidimensional coordinate system that can include, but is not limited to, Cartesian coordinates and polar coordinates. In such embodiments, larger composite zones can be constructed by associating one or more sub zones.

As the user moves about the interior of the indoor location 300, the user of the mobile computing device can enter and exit multiple zones. As the user moves through the multiple zones, the position locator in the mobile computing device can continually and/or automatically determine and update the location that the context-based vocabulary processor uses to determine a specific context and the related speech recognition vocabulary subsets.

In other embodiments, to conserve battery power, or to protect the privacy of the user, the position locator in the computing device can be configured to only determine the position at the request of the user. In such embodiments, user would need to initiate a position determining process on the mobile computing device, i.e. launch an application, initiate a particular mode of operation, or respond to a prompt using one or more user interfaces on the mobile computing device.

In related embodiments, as a user with a mobile computing device approaches or enters one or more zones of the indoor location 300, the mobile computing device can be alerted over various types of wireless communication technology to initiate a location-based context-limited speech recognition operation mode. In some embodiments, the mobile computing device will automatically switch into location-based context-limited speech recognition mode. In other embodiments, the mobile computing device will alert, i.e. vibrate or sound, to prompt the user to manually initiate the location-based context-limited speech recognition mode. For example, the mobile computing device can receive an alert from a local or remote broadcasting communication system or reference an internal position locator and a related database that indicates that the user is in or is entering a location-based context-limited speech recognition area. At that time, the mobile computing device can automatically or manually download, retrieve, or otherwise access information regarding the location-based context-limited speech recognition area, i.e. download or launch an application, access a data store, or connect to a server. For example, as the user approaches a store, the mobile computing device can automatically download, or prompt the user to manually download, an application, or other information, associated with or otherwise provided by the store. Such an application can include all or some of the functionality necessary for the mobile computing device to operate in a location-based context-limited speech recognition mode with reference to context and position information specific to the store.

In reference to FIG. 3, indoor location 300 can be a department store. As a user enters doors 361 and goes to the left, he or she would normally pass through zones 365 around the door, zone 360 of the entryway, and overlapping region 367 of zones 360 and 355 on his or her way to zone 355. Once the mobile computing device that the user is carrying determines that it is located in zone 355, the context-based vocabulary processor in the mobile computing device can determine a specific context associated with zone 355. In one specific example, the context can include information regarding items and/or merchandise displayed on tables 385 and 387, as well as information regarding sales and other signage for items and/or merchandise displayed in display cases 381 and 383. In such embodiments, the context associated with zone 355 can change dynamically as the merchandising, i.e. the placement of items merchandise, on display table 385 and 387 and display cases 381 and 383 is changed. Such context can include information about ongoing or future sales, prices, available sizes and colors, etc., of the items associated with the context of zone 355. For example, once the mobile computing device that a user is carrying has determined that it is located in zone 355, it can determine a context associated with the zone 355 in order to determine a limited or constrained speech recognition vocabulary that includes expected words and phrases regarding items displayed in the zone. A user can then initiate the speech recognition mode on the mobile computing device and ask general or specific questions regarding the items in zone 355, such as, "Does this pink blouse come in a size 2 and is it in stock?" Based on the information regarding the particular pink blouse included in the context associated with zone 355, the speech recognizer of the computing device access internal local or remote limited or constrained expected speech recognition vocabulary subset to expect questions about the specific items, such as the pink blouse, in zone 355. In such contexts, the vocabulary subset can include links to barcodes, SKU codes, and/or other inventory numbers to access store or business related information about that item. For example, such links in the vocabulary subset can access an inventory control system or an online store. Accordingly, the vocabulary subset or context associated with zone 355 can include predetermined or real-time information stored locally on the mobile computing device or remotely on a server computer about the price and/or availability of specific goods, i.e. the pink blouse.

As the user moves from zone 355 to zone 350, the position locator can determine that the mobile computing device and the user are located in an overlapping or interim zone 357. When the user and the mobile computing device are determined to be in the overlapping zone 357, the context based vocabulary processor of mobile computing device can determine that is an area associated with two or more contexts, i.e. a context associated with zone 350 as well as a context associated with zone 355.

Another example of the overlapping zone area of indoor location 300 includes zone 310 and 315. As shown zone 310 and zone 315 overlap in the area 317 which is generally located around display tables 312, 314, and 316. In this particular example, the contexts associated with zone 310 in zone 315 can include a similar or common information regarding the items or displays on the tables. In contrast however, the context associated with zones 310 and 315 can also include disparate information based on the visibility of particular items stored in those zones. For example, zone 310 can be associated with a context that includes information regarding items or merchandise on display on display cases 319, while context associated with zone 315 can include information about items or merchandise displayed in display case 318 that might not be visible or be of interest when a user is in zone 310. A specific example of this type of zone arrangement can include a situation in which formalwear is being displayed in display cases 319, swimwear is being displayed in display case 318 and ties are being displayed on tables 312, 314, 316. A user in zone 310 might be interested in the suits and other formalwear items on display in display case 319, but not be interested in swimsuits and other items on display in display case 318. In such scenarios, the use of the term "suits", which can refer to both business suits and bathing suits couple confuse and possibly prevent the mobile computing device from accurately recognizing a voice command about an item of interest on display case 319.

By tailoring the limited or constrained speech recognition vocabulary subset and associating the vocabulary subset with a context that includes information about the actual items on display, the mobile computing device can accurately interpret a speech recognition command or question from the user about a particular item in the zone and then retrieve specific information about the item from the context or other information associated with the context. Accordingly, when the mobile computing device determines that it is in zone 310, the mobile computing device can retrieve or determine a vocabulary subset that includes expected voice commands concerning business suits in display case 319. By referencing vocabulary subset that includes the expected voice commands about business suits, the mobile computing device can determine that a voice command received from the user while he or she is in zone 310 is directed toward business suits instead of bathing suits with greater with a higher degree of confidence while using fewer computing resources. A similar situation is illustrated with respect to zones 330 and 335 which overlap in the area 337. Each of zones 330, 337, and 335, can be associated with one or more contexts that can include common or disparate information about possible interactions that a user might have with the speech recognizer of the mobile computing device while the user is in one of the three zones. For example, depending on where in zones 330, zone 335, or overlap region 337, the mobile computing determines the associated user is located, a corresponding vocabulary subset can retrieved or determined. The corresponding vocabulary subset can include a list of expected voice commands that corresponds to items in the corresponding zone. In this particular example, expected voice commands in the vocabulary subset for zone 330 can include voice commands regarding the items displayed on table 339. The expected voice commands in the vocabulary subset for zone 335 can include voice commands regarding the items displayed on table 338. Similarly, the expected voice commands in the vocabulary subset for region 337 can include voice commands regarding the items displayed on both table 338 and table 339, or at least some portion thereof.

Another exemplary embodiment can be related to the lounge area within zone 320. As with the other zones shown in the indoor location 300, zone 320 can be associated with one or more contexts specific to the lounge area and the activities that the store owner might expect users engage in while in the lounge area. For example, a context associated with zone 320 can include information about possible table service of beverages, i.e. coffee or cocktails, and information or routines for sending speech recognition requests from the mobile computing device of a user to a server or bar to fulfill such orders. In another exemplary use case, a user in the lounge area of zone 320 can listen to music or watch television using context-specific voice commands. In such cases, the context associated with zone 320 can include information about available commands for operating and controlling the various entertainment devices. A user, while in zone 320, can use his or her mobile computing device to issue voice commands in the context of playing a specific song title or movie. In a similar embodiment, the mobile computing device can also be used to recognize voice commands in the context of adjusting environmental conditions, such as lighting and heating levels. In all of such cases, each of such contexts can include information about the available commands and controls available to the user through the mobile computing device. Such context can then be associated with limited or constrained speech recognition vocabularies to increase the effectiveness and accuracy of the speech recognizer in the mobile computing device.

Figure 4:
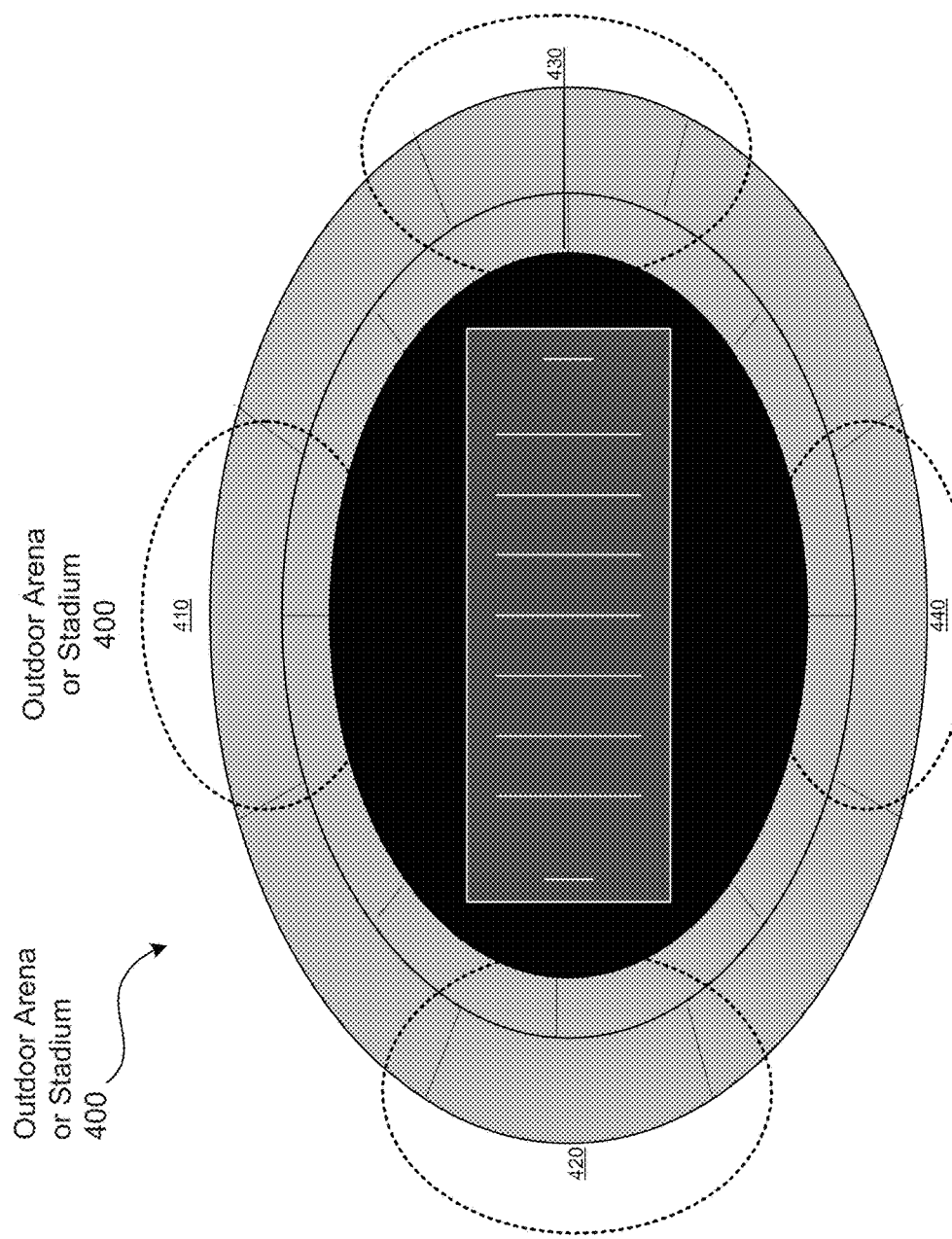
FIG. 4 illustrates a simplified schematic of a speech recognition system according to various embodiments of the present invention.

FIG. 4 is a simplified layout of an outdoor arena stadium 400 in which various embodiments of the present invention can be implemented. As shown the outdoor arena or stadium 400 can include multiple zones, 410, 420, 430, and 440. In such embodiments, multiple users, indeed often thousands of users, can be in attendance at an event in the outdoor arena or stadium 400. Each user can carry his or her own mobile computing device implementing or executing various embodiments of the present invention for location-based context-limited speech recognition. Each zone in the outdoor arena or stadium 400 can be associated with one or more contexts, each of which can include information specific to the objects, facilities, amenities, and points of view of users who are in one of the four exemplary zones. For example, a context associated with zone 420 can include information regarding the type and location of concessions in and around zone 420. In other scenarios, the user may wish to know where the nearest restroom is in zone 420. Accordingly, a computing device in zone 420 can determine that is in it is in zone 420, and based on the determined location can refer to one or more contexts associated with that particular zone. Such contexts can include information regarding the objects, facilities, amenities, and points of view related to zone 420, and may also include reference to or definitions of limited or constrained speech recognition vocabulary subsets specific to other information associated or included in the context.

Such limited or constrained speech recognition vocabulary subsets can include words and phrases that the speech recognizer of the mobile computing device can expect from a user in zone 420 to ask or issue in a speech recognition command or request. For example, one context associated with zone 420 can include information about display of famous athletes on a wall of the outdoor arena or stadium 400 opposite zone 420, i.e. a sign or display is attached to the wall above the heads of users seated in zone 430. In such a use case, a user in zone 420 can issue a voice request for information regarding the display visible from his seat. Based on the context in the limited speech recognition vocabulary subsets associated with the context of zone 420, the mobile computing to recognize the voice command and retrieve specific information about the display. In some embodiments, for example there are multiple displays of famous athletes visible from zone 420, in such scenarios the mobile computing device may prompt the user for clarification, i.e. asked the user to specify which specific famous athlete to which they are referring.

In outdoor scenarios implementing various embodiments of the present invention, such as outdoor arena or stadium 400 shown in FIG. 4, zones 410, 420, 430, and 430 can be defined with reference to outdoor location determination systems and devices such as GPS satellites and ground-based GPS location determination units or devices. In such high-resolution location determination systems, each of the zones shown in FIG. 4 can be further segmented to include even more granular zones, such that a user using a mobile computing device with a GPS location determination component sitting in one extreme end of zone 420, can get more specialized or different context-related information that can be different from the information that might be provided to user who is sitting on the other extreme end of zone 420. For example, users in different sections of zone 420 can get different directions to the nearest restroom based on the sub zone in which their mobile computing device has determined they are in. Accordingly, when users in different subzones of zone 420 ask their personal mobile computing device, "Where is the nearest restroom?", each mobile computing device can reference a context and speech recognition vocabulary subset related with the sub zone they are in to accurately direct the user from the particular sub zone in which they are currently located to the nearest restroom. In some embodiments, the nearest restroom to a user in one sub zone of zone 420 can be different or farther from a restroom closest to another sub zone in the zone 420.

Figure 5:
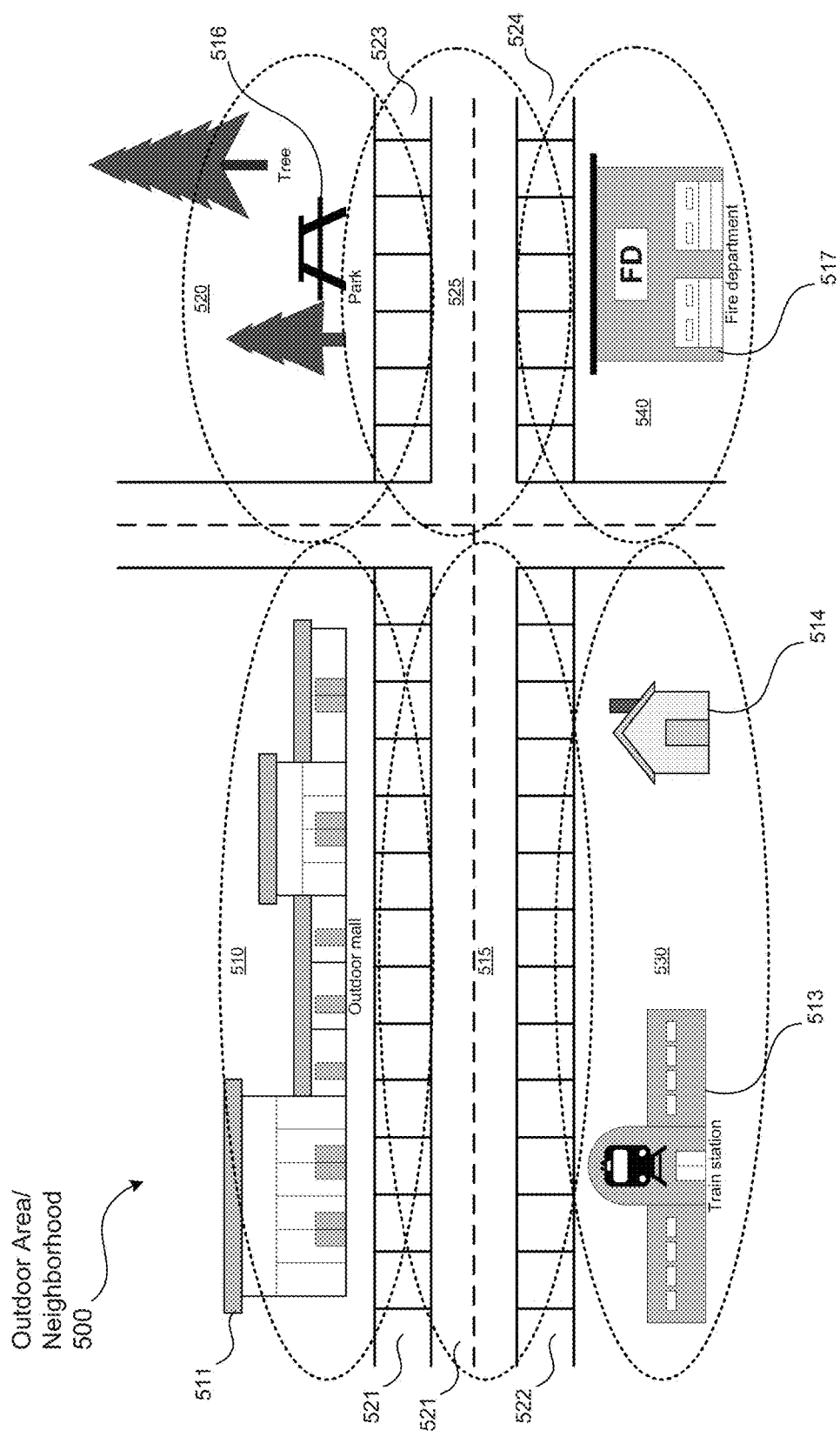
FIG. 5 illustrates a simplified schematic of a speech recognition system according to various embodiments of the present invention.

FIG. 5 illustrates large-scale outdoor implementation in outdoor area/neighborhood 500 of various embodiments of the present invention. As shown outdoor area/neighborhood 500 can include multiple large-scale zones 510, 515, 520, 525, 530, and 540. As shown, the various zones defined in the outdoor area/neighborhood 500 can include overlapping and exclusive areas. Zone 510 can include an outdoor mall 511 and portions of the sidewalk 521. Zone 515 can include sidewalks 521 in 522 as well as some portion of street 512. Zone 530 can include a train station 513 and a landmark 514 as well as some portion of sidewalk 522. Similarly zone 520 can include a park 516 in some portion of sidewalk 523 can include a portion of street 512 and sidewalk 524. Finally, zone 540 can include the fire station 517 and a portion of sidewalk 524. Each of the areas covered by the particular zones shown in outdoor area/neighborhood 500 include areas in which a user can use various outdoor location determination devices and applications. Such outdoor location determination devices and applications can be included in a personal mobile computing device that the user carries. Such mobile computing device can then determine the location of a user whether he is in zone 510, zone 530, zone 520, or zone 540. Similarly, a mobile computing device can include vehicle mounted computing devices such that an outdoor location determination device or application in the mobile computing device can determine the location of the user and/or his vehicle in zone 515 or zone 525. Such large scale outdoor area/neighborhood 500 use of various embodiments of the present invention can include contexts associated with each of the zones regarding the places, facilities, services, dangers, conditions in one or more particular zones. For example, based on the determined location in one or more of the zones shown, a mobile computing device can reference a specific context associated with the zone in which it is located and limit the expected voice commands to increase the accuracy. For example a user in zone 510, can issue a voice command to his or her mobile computing device to inquire about the hours of operation of a specific store located in the outdoor mall 511. Because the speech recognizer of the mobile computing device is expecting voice commands about the outdoor mall 511, it can provide better accuracy for executing or responding to received voice commands.

Figure 6:
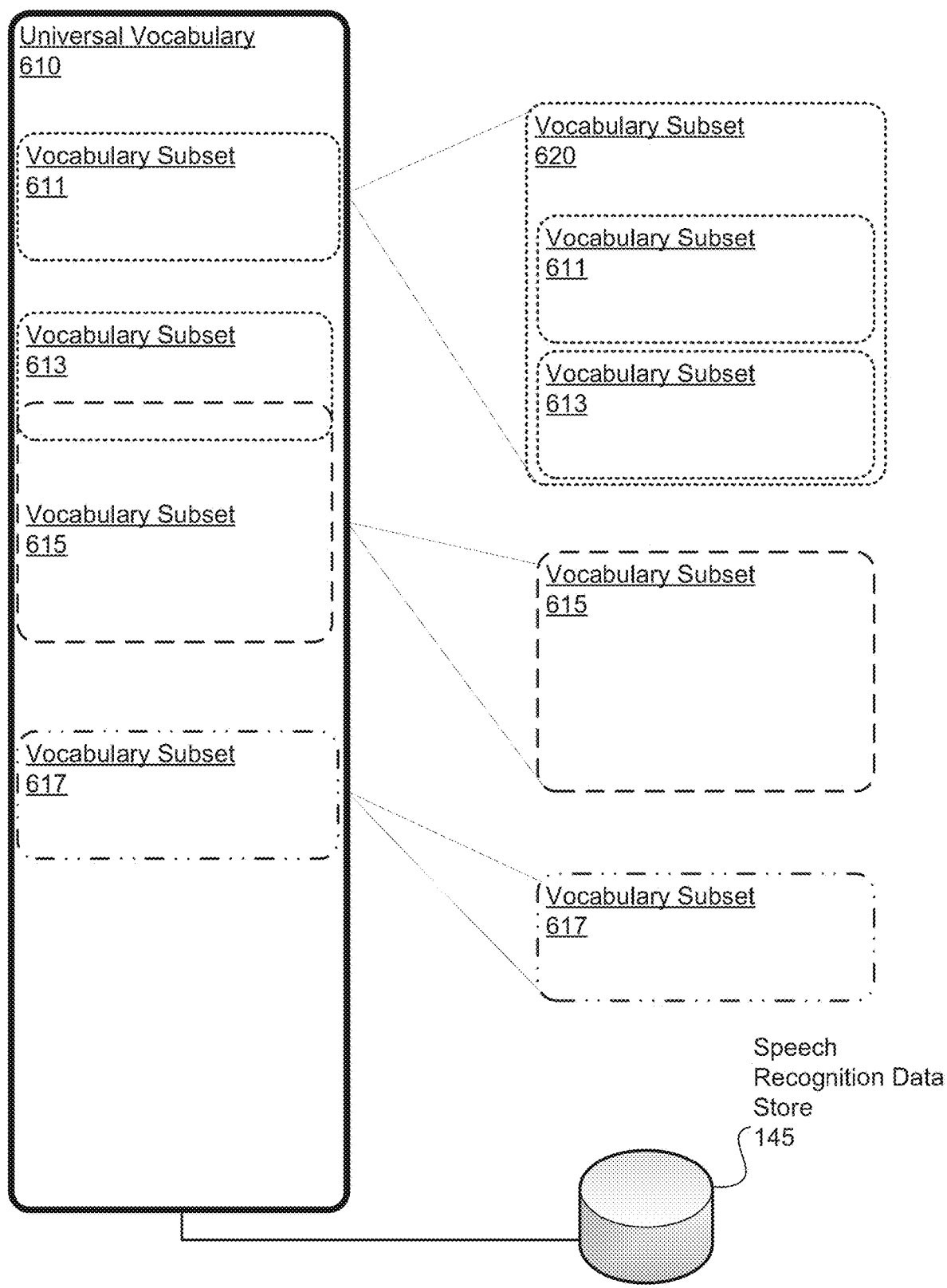
FIG. 6 illustrates a simplified schematic of a speech recognition system according to various embodiments of the present invention.

FIG. 6 illustrates a simplified schematic of universal speech recognition vocabularies and speech recognition vocabulary subsets according to various embodiments of the present invention. Universal vocabulary 610 represents the entirety of all the words, phrases, and commands that a particular speech recognizer or speech recognition system can recognize and/or respond to in order to initiate various processes and routines to accomplish or complete various tasks or functions. As shown, universal speech recognition vocabulary 610 can include a number of speech recognition vocabulary subsets, such as vocabulary subsets 611, 613,

615, and 617. While such vocabulary subsets can include mutually exclusive collection of limited or constrained subsets from universal vocabulary 610, other exemplary vocabulary subsets, such as vocabulary subsets 613 and 615, can include overlapping collections of vocabularies from universal vocabulary 610. Additionally, even mutually exclusive vocabulary subsets can be selected and combined to compose a composite vocabulary subset. For example, vocabulary subset 620 can be composed to include otherwise mutually exclusive vocabulary subsets 611 and 613. Each of the vocabulary subsets shown in FIG. 6 can be associated with one or more contexts which describe one or more aspects of the user experience while in a particular physical location. As such, each vocabulary subset can be associated with a particular physical location via the association with a particular context which might have or include information regarding the users experience within the physical location. In related embodiments, each vocabulary subset can be associated with a vocabulary subset identifier which can be referenced by or stored in a particular context. Thus, once a mobile computing device determines the physical location of the user and or the mobile device, the associated context can be referenced to determine an associated speech recognition vocabulary subset designated by one or more vocabulary subset identifiers. All such speech recognition vocabularies, vocabulary subset, composite vocabulary subsets, vocabulary subset identifier can be stored in a speech recognition vocabulary store 145. Speech recognition vocabulary store can be resident in computing device or maintained remotely in a centralized speech recognition computer or other server.

Figure 7:
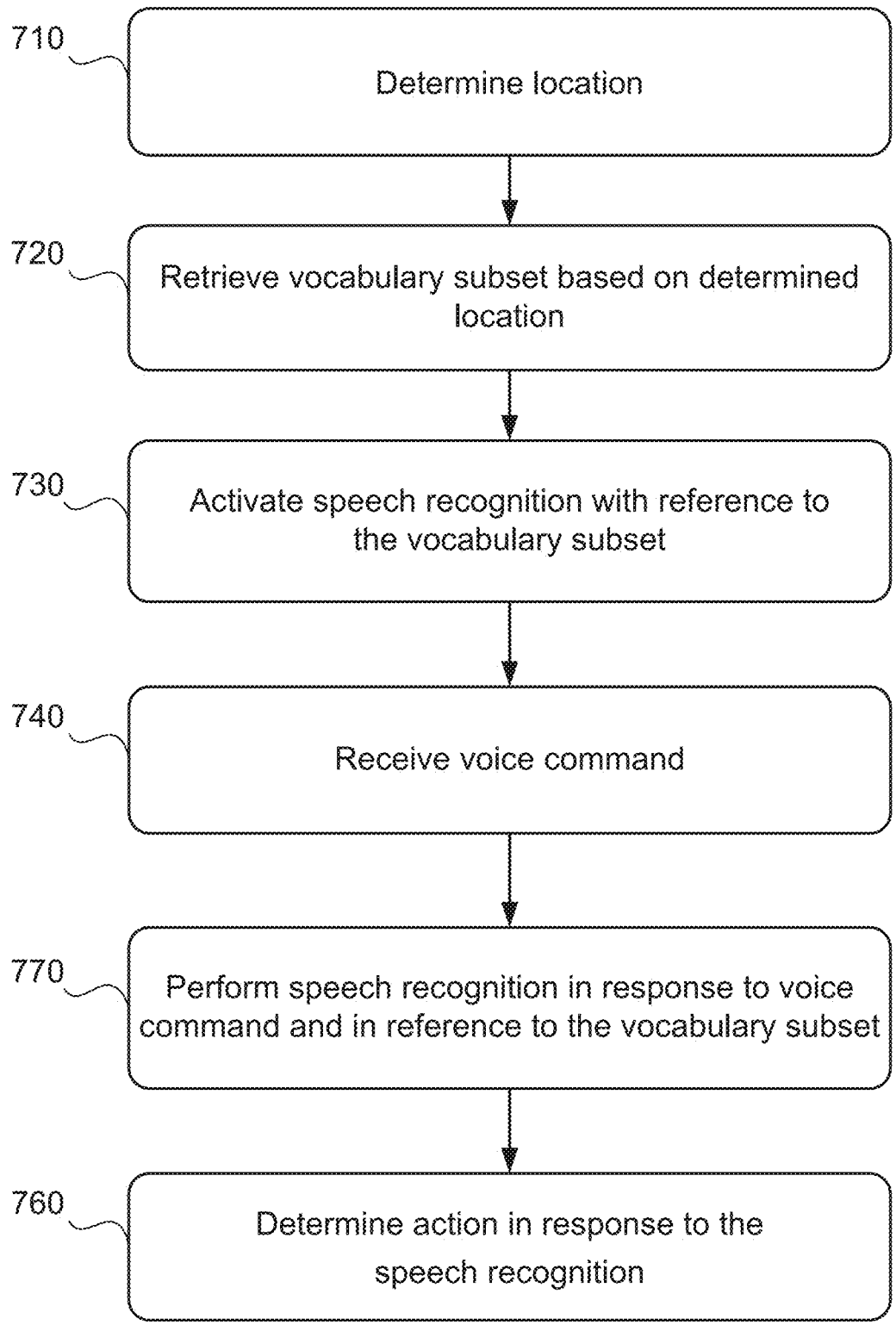
FIG. 7 illustrates a simplified schematic of a speech recognition system according to various embodiments of the present invention.

FIG. 7 is a flowchart of a method 700 according to various embodiments of the present invention. Such methods can begin at action 710, in which the location of the user or computing device. The location of the user or computing device can be determined with reference to various types of location determination technologies and techniques. For example, a location of the computing device, such as a smart phone, tablet, or computer, can be determined using known triangulation systems, such as GPS systems, optical scanning based systems, such as QR and barcode scanning systems, as well as other radiofrequency, infrared, ultraviolet, and optical broadcast systems.

Once the location is determined, the computing device can retrieve a vocabulary subset based on the determined location. In some embodiments, the retrieved vocabulary subset can be associated with a particular coordinate or range of coordinates that can be matched to the determined location. In other embodiments, the vocabulary subset can be associated with a particular context that is associated with the determined location based on some description of potential user experiences within that location. In related embodiments, vocabulary subset can be associated or assigned a vocabulary subset identifier. Such vocabulary subset identifiers can be related to and/or derived from the determined location, i.e. a coordinate value for predetermined zone identifiers. For example, vocabulary subset can be associated with one or more GPS coordinates which serve as a vocabulary subset identifier. In other embodiments, a range of GPS coordinates can be included in one or more contexts. Such contexts can be associated with a context identifier which can then also be used as a vocabulary subset identifier or used to derive a vocabulary subset identifier.

The determined speech recognition vocabulary subset or vocabulary subsets can then be used by a speech recognizer. Speech recognizer can be activated in action 730 and reference the one or more vocabulary subsets associated with the determined location. Vocabulary subsets act as a limited or constrained speech recognition vocabulary to limit the scope or range of words, phrases, or commands that the speech recognizer will expect. In action 740, the speech recognizer can receive a voice command from one or more users. In action 750, the speech recognizer can perform a speech recognition routine or process in response to the received voice command and in reference to the vocabulary subset. In action 760, the speech recognizer to determine an appropriate response to the recognized voice command.

Figure 8:
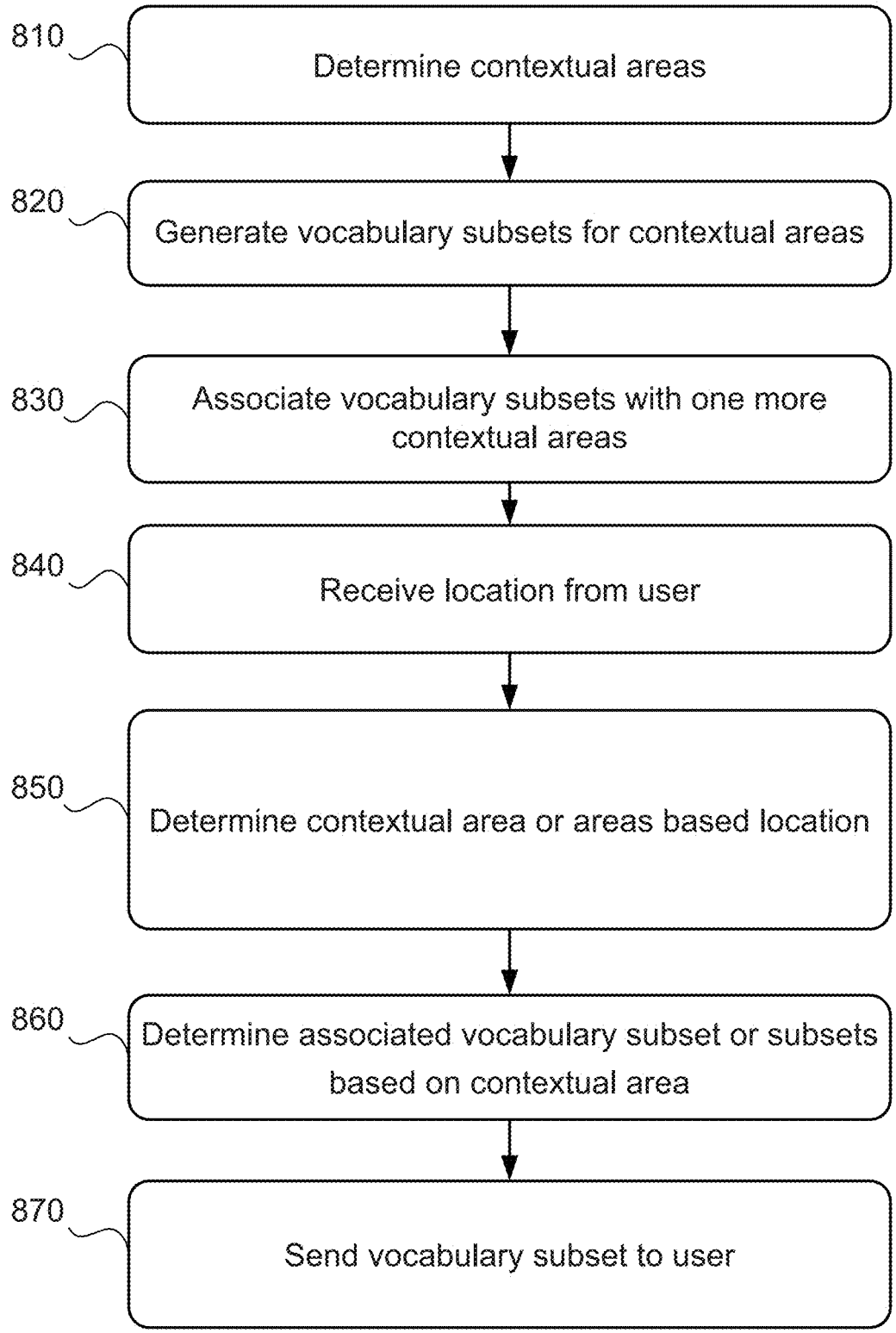
FIG. 8 illustrates a simplified schematic of a speech recognition system according to various embodiments of the present invention.

FIG. 8 is a flowchart of a method 800 according to various embodiments of the present invention. In action 810, one or more contextual areas are determined. Such contextual areas can be defined by the range of experiences that a user might encounter while in some defined physical location. For example, the contextual area may be defined by objects the user might encounter while in a particular physical location, i.e. such as items in the store or objects in a museum. Based on the range of experience the user might encounter while in that defined physical location, one or more vocabulary subsets for the contextual areas can be generated, in action 820. Such vocabulary subsets can include specialized vocabulary targeted towards the specific expected experience that a user might encounter and the associated physical location. For example, the vocabulary subsets can include general and specialized words regarding objects within the physical location of the contextual area. Once the vocabulary subsets are generated, the subsets can be associated with one or more contextual areas or physical location and/or stored in a data store accessible by one or more computing device, in action 830. For example, the Association between the various vocabulary subsets of the one or more physical location and or contextual areas, can be stored locally on a particular mobile computing device more stored remotely on a network accessible remote server computer.

In such embodiments, the local or remote computing device receive a location from the user, at action 840. Receiving a location from the user can include automatically or manually determining a physical location using a position locator mobile computing device. In other embodiments, receiving a location from a user can include receiving automatically determined coordinates from a position locator or manually entered coordinate or zonal information from a user through a user interface over one or more wired or wireless communication. Once the location of the user or computing device is received, contextual area for areas based on the location of the determined, in action 850. In response to the determined textual area or areas associated vocabulary subset or subsets can be determined, action 860. In some embodiments determining the associated vocabulary subset or subsets includes reading for determining a vocabulary subset identifier from the related contextual area or related contextual area identifier. The associated vocabulary subset or subsets can then be provided to user for use in speech recognition functions and tasks, in action 807. Sending vocabulary subsets to the user can include retrieving the vocabulary subset from a local memory on a computing device, or sending the vocabulary subset from a remote server computer to a local computing device over one or more wired or wireless communication networks.

Figure 9:
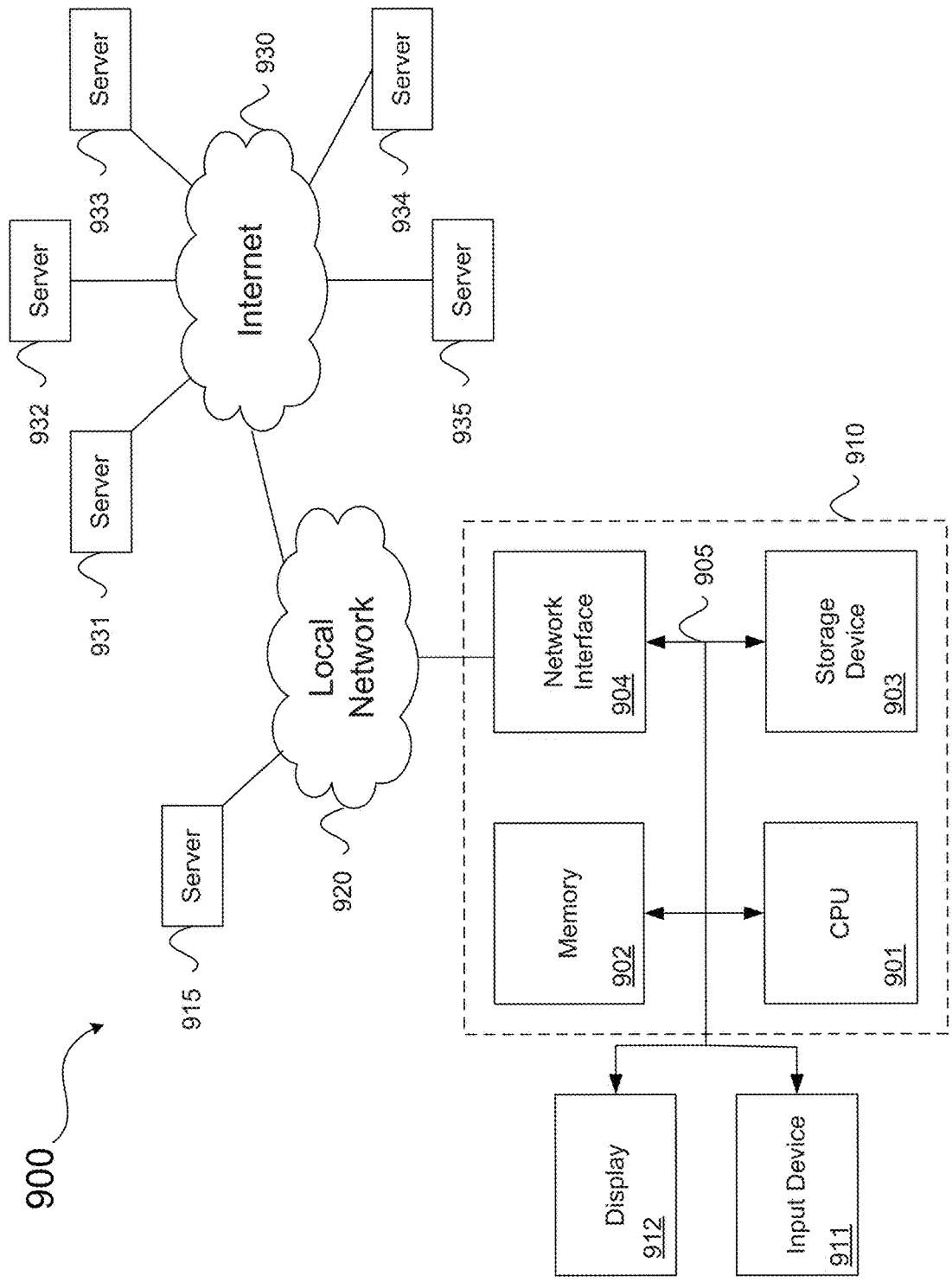
FIG. 9 illustrates a simplified schematic of a speech recognition system according to various embodiments of the present invention.

Exemplary computer system 910 and local network 920 that can be used to implement and be improved by various embodiments of the present invention are illustrated in FIG. 9. Computer system 910 includes a bus 905 or other communication mechanism for communicating information, and a processor 901 coupled with bus 905 for processing information.

Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. In one exemplary embodiment, memory 902 can be loaded with to include instructions for initiation process that instructs CPU 901 to set an internal inter-integrated circuit communication protocol switch included in the connector head of composite network cable 200 to couple to and read from an EEPROM or other memory in the connector head during startup or initialization. Such instructions can be stored in nonvolatile memory of storage device 903 can be loaded into memory 902 for execution by CPU 901 upon startup, reboot or other initialization procedures.

A storage device 903 can also be provided for storing other information and instructions. Common forms of storage devices include, for example, a hard drive, a magnetic disk, an optical disk, a CD-ROM, a DVD, a flash memory, a USB memory card, or any other medium from which a computer can read.

Storage device 903 may include source code, binary code, or software files for performing the techniques above, for example. Storage device and memory are both examples of computer readable media.

Computer system 910 may be coupled via bus 905 to a display 912, such as a cathode ray tube (CRT) or liquid crystal display (LCD), for displaying information to a computer user. An input device 911 such as an in-vehicle touch screen, is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 the local network 920. In some implementations, the network interface 904 may be for Broadband Wireless Access (BWA) technologies, while in other implementations network interface 904 can include network interface identification information or identifiers, such as a MAC address. In such implementation, network interface 904 sends and receives electrical, electromagnetic, or optical signals that carry digital data streams representing various types of information.

Computer system 910 can send and receive information, including messages or other interface actions, through the network interface 904 across a local network 920, an Intranet, or Internet 930, or the inter-integrated circuit communication protocol. For a local network, computer system 910 may communicate with a plurality of other computer machines, such as server 915, which may or may not be directly coupled to switch 940 in a rack type configuration. Accordingly, computer system 910 and server computer systems represented by server 915 may form a cloud computing network, which may be programmed with processes described herein.

In an example involving the Internet, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computing device comprising:
   a processor; and
   a non-transitory computer readable storage medium having stored thereon instructions that, when executed by the processor, cause the processor to:
   upon entering one or more zones of an indoor location, receive an alert from a local or remote broadcasting communication system indicating that a location-based context-limited voice recognition operation mode may be initiated on the computing device;
   in response to receiving the alert, prompt a user of the computing device to manually initiate the location-based context-limited voice recognition operation mode;
   upon receiving an indication from the user that the location-based context-limited voice recognition operation mode should be initiated, determine, using a position locator, a current location of the computing device, the current location being within a first zone in the one or more zones;
   transmit the current location to a remote server system;
   receive, from the remote server system, a first vocabulary subset related to the first zone, wherein the first vocabulary subset comprises words pertaining to a plurality of items sold within the first zone and links to inventory numbers associated with the plurality of items; and
   subsequently to receiving the first vocabulary subset from the remote server system:
      receive a first voice command from the user pertaining to a price or availability of an item in the plurality of items;
      recognize, using a voice recognizer local to the computing device, first voice command based on the first vocabulary subset received from the remote server system;
      access, via a link to an inventory number associated with the item in the first vocabulary subset, an inventory control system of the indoor location in order to retrieve the price or availability of the item; and
      return a response to the user with the retrieved price or availability.

2. The computing device of claim 1 wherein the first vocabulary subset further comprises a listing of expected voice commands based on the plurality of items.

3. The computing device of claim 2 further comprising a display or voice synthesizer for presenting the response to the user.

4. The computing device of claim 1 wherein the non-transitory computer readable storage medium further includes instructions that cause the processor to:
- determine that the computing device has moved from the current location within the first zone to another location within a second zone in the one or more zones;
- transmit said another location to the remote server system;
- receive, from the remote server system, a second vocabulary subset related to the second zone, wherein the second vocabulary subset is different from the first vocabulary subset and comprises words pertaining to another plurality of items sold within the second zone and links to inventory numbers associated with said another plurality of items; and
- subsequently to receiving the second vocabulary subset from the remote server system:
  - receive a second voice command from the user;
  - recognize the second voice command based on the second vocabulary subset received from the remote server system; and
  - return a second response to the user.

5. The computing device of claim 1 wherein the indoor location is a department store, mall, amusement park, theater, or event arena.

6. The computing device of claim 1 wherein the indoor location is a hospital, library, or school.

7. A method comprising:
- upon entering one or more zones of an indoor location, receiving, by a computing device, an alert from a local or remote broadcasting communication system indicating that a location-based context-limited voice recognition operation mode may be initiated on the computing device;
- in response to receiving the alert, prompting, by the computing device, a user of the computing device to manually initiate the location-based context-limited voice recognition operation mode;
- upon receiving an indication from the user that the location-based context-limited voice recognition operation mode should be initiated, determining, by the computing device using a position locator, a current location of the computing device, the current location being within a first zone in the one or more zones;
- transmitting, by the computing device, the current location to a remote server system;
- receiving, by the computing device from the remote server system, a first vocabulary subset related to the first zone, wherein the first vocabulary subset comprises words pertaining to a plurality of items sold within the first zone and links to inventory numbers associated with the plurality of items; and
- subsequently to receiving the first vocabulary subset from the remote server system:
  - receiving a first voice command from the user pertaining to a price or availability of an item in the plurality of items;
  - recognizing, using a voice recognizer local to the computing device, the first voice command based on the first vocabulary subset received from the remote server system;
  - accessing, via a link to an inventory number associated with the item in the first vocabulary subset, an inventory control system of the indoor location in order to retrieve the price or availability of the item; and
  - returning a response to the user with the retrieved price or availability.

8. The method of claim 7 wherein the first vocabulary subset further comprises a listing of expected voice commands based on the plurality of items.

9. The method of claim 8 further comprising presenting the response to the user through a display or voice synthesizer.

10. The method of claim 7 further comprising:
- determining that the computing device has moved from the current location within the first zone to another location within a second zone in the one or more zones;
- transmitting said another location to the remote server system;
- receiving, from the remote server system, a second vocabulary subset related to the second zone, wherein the second vocabulary subset is different from the first vocabulary subset and comprises words pertaining to another plurality of items sold within the second zone and links to inventory numbers associated with said another plurality of items; and
- subsequently to receiving the second vocabulary subset from the remote server system:
  - receiving a second voice command from the user;
  - recognizing the second voice command based on the second vocabulary subset received from the remote server system; and
  - return a second response to the user.

11. The method of claim 7 wherein the indoor location is a department store, mall, amusement park, theater, or event arena.

12. The method of claim 7 wherein the indoor location is a hospital, library, or school.

13. A non-transitory computer readable medium having stored thereon program code executable by a processor of a device, the program code comprising:
- code that causes the processor to, upon entering one or more zones of an indoor location, receive an alert from a local or remote broadcasting communication system indicating that a location-based context-limited voice recognition operation mode may be initiated on the device;
- code that causes the processor to, in response to receiving the alert, prompt a user of the device to manually initiate the location-based context-limited voice recognition operation mode;
- code that causes the processor to, upon receiving an indication from the user that the location-based context-limited voice recognition operation mode should be initiated, determine, using a position locator, a current location of the device, the current location being within a first zone in the one or more zones;
- code that causes the processor to transmit the current location to a remote server system;
- code that causes the processor to receive, from the remote server system, a first vocabulary subset related to the first zone, wherein the first vocabulary subset comprises words pertaining to a plurality of items sold within the first zone and links to inventory numbers associated with the plurality of items; and
- subsequently to receiving the first vocabulary subset from the remote server system:
  - code that causes the processor to receive a first voice command from the user pertaining to a price or availability of an item in the plurality of items;
  - code that causes the processor to recognize, using a voice recognizer local to the device, the first voice command based on the first vocabulary subset received from the remote server system;

code that causes the processor to access, via a link to an inventory number associated with the item in the first vocabulary subset, an inventory control system of the indoor location in order to retrieve the price or availability of the item; and code that causes the processor to return a response to the user with the retrieved price or availability.

14. The non-transitory computer readable medium of claim 13 wherein the first vocabulary subset further comprises a plurality of expected voice commands based on the plurality of items.

15. The non-transitory computer readable medium of claim 13 wherein the device comprises a display or voice synthesizer for presenting the response to the user.

16. The non-transitory computer readable medium of claim 13 wherein the program code further comprises:

code that causes the processor to determine that the device has moved from the current location within the first zone to another location within a second zone in the one or more zones;

code that causes the processor to transmit said another location to the remote server system;

code that causes the processor to receive, from the remote server system, a second vocabulary subset related to the second zone, wherein the second vocabulary subset is different from the first vocabulary subset and comprises words pertaining to another plurality of items sold within the second zone and links to inventory numbers associated with said another plurality of items; and subsequently to receiving the second vocabulary subset from the remote server system:

code that causes the processor to receive a second voice command from the user;

code that causes the processor to recognize the second voice command based on the second vocabulary subset received from the remote server system; and code that causes the processor to return a second response to the user.

17. The non-transitory computer readable medium of claim 13 wherein the indoor location is a department store, mall, amusement park, theater, or event arena.

18. The non-transitory computer readable medium of claim 13 wherein the indoor location is a hospital, library, or school.

* * * * *